(12) United States Patent
Kraus

(10) Patent No.: US 7,347,574 B2
(45) Date of Patent: Mar. 25, 2008

(54) DECORATIVE LENS

(75) Inventor: Karen Melody Kraus, Farmington Hills, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 225 days.

(21) Appl. No.: 11/141,735

(22) Filed: May 31, 2005

(65) Prior Publication Data

US 2006/0268535 A1 Nov. 30, 2006

(51) Int. Cl.
*G01D 11/28* (2006.01)

(52) U.S. Cl. .......................... 362/23; 362/27; 362/28; 362/29; 362/489

(58) Field of Classification Search ................. 362/23, 362/27, 29, 235, 28, 489; 116/48, 286, DIG. 36, 116/288; 340/815
See application file for complete search history.

(56) References Cited

U.S. PATENT DOCUMENTS

| | | | |
|---|---|---|---|
| 4,376,934 A | | 3/1983 | Prohaska et al. |
| 5,259,333 A | * | 11/1993 | Iino et al. .................. 116/286 |
| 5,645,666 A | | 7/1997 | Jones |
| 5,695,269 A | | 12/1997 | Lippmann et al. |
| 5,741,058 A | | 4/1998 | Suzuki et al. |
| 5,915,822 A | * | 6/1999 | Ogura et al. ................. 362/26 |
| 6,120,159 A | * | 9/2000 | Inoguchi et al. .............. 362/29 |
| 6,181,301 B1 | * | 1/2001 | Inoguchi et al. ............... 345/5 |
| 6,210,011 B1 | * | 4/2001 | Ikeuchi et al. ................ 362/26 |
| 6,302,551 B1 | * | 10/2001 | Matumoto ..................... 362/27 |
| 6,379,015 B2 | | 4/2002 | Wilhelm et al. |
| 6,454,422 B1 | | 9/2002 | Williams |
| 6,490,776 B1 | | 12/2002 | Gager et al. |
| 6,520,654 B2 | | 2/2003 | Angell et al. |
| 7,015,986 B2 | | 3/2006 | Brandt et al. |
| 2002/0149495 A1 | | 10/2002 | Schach et al. |
| 2003/0090886 A1 | | 5/2003 | Eckardt et al. |
| 2003/0107497 A1 | | 6/2003 | Krenz et al. |
| 2003/0230154 A1 | | 12/2003 | Ayres |

FOREIGN PATENT DOCUMENTS

| | | |
|---|---|---|
| DE | 10110991 | 11/2002 |
| DE | 10153100 | 5/2003 |
| DE | 10303278 | 8/2004 |
| DE | 102004049857 | 5/2005 |
| EP | WO 03/025511 A1 | 3/2003 |

* cited by examiner

*Primary Examiner*—Thomas M. Sember
(74) *Attorney, Agent, or Firm*—Brinks Hofer Gilson & Lione

(57) ABSTRACT

An instrument gage assembly includes an applique and at least one gage mechanism mounted to a rear surface of the applique. Each gage mechanism including a pointer shaft extending through the applique and projecting outward from a front surface of the applique. A gage pointer is mounted onto each pointer shaft adjacent the front surface of the applique, and the front surface of the applique includes graphics printed thereon. A plurality of lights are mounted behind the applique to illuminate the graphics printed on the applique, and a one-piece lens is positioned at a distance from the applique with the gage pointer being positioned between the front surface of the applique and the lens. The lens includes a lens body having functional graphics molded therein to compliment the functionality of the gage and adapted to be visible when the lights behind the applique are not on.

10 Claims, 5 Drawing Sheets

DECORATIVE LENS

BACKGROUND OF INVENTION

1. Technical Field of the Invention

The present invention generally relates to a decorative lens cover. More specifically, the present invention relates to a decorative lens cover for a high impact application, such as an automotive instrument cluster, having functional and/or decorative graphics molded therein.

2. Description of the Prior Art

High impact instrument clusters are currently popular because of their high contrast, bright lighting. However, in the "off" mode, when the lights are not powered, the instrument cluster appears completely black. This is because the lens is typically smoked, and all of the graphics are printed on the back applique. In order to add depth and styling options to such instrument clusters, lenses have been developed wherein decorations or graphics are attached on a surface of the lens. This requires heat staking, ultrasonic welding, or other means of fastening, which adds to assembly complexity, part count, and ultimately to the cost of production.

Therefore, there is a need for a one-piece lens which includes decoration or graphics that are molded within the lens to provide visible graphics when the lights of the instrument cluster are not on.

SUMMARY OF THE INVENTION

The disadvantages of the prior art are overcome by providing a one-piece lens having different visual features molded therein.

In an aspect of the present invention, an instrument gage assembly includes an applique and at least one gage mechanism mounted to a rear surface of the applique. Each gage mechanism includes a pointer shaft extending through the applique and projecting outward from a front surface of the applique. A gage pointer is mounted onto each pointer shaft adjacent the front surface of the applique. The front surface of the applique includes graphics printed thereon, and a plurality of lights are mounted behind the applique to illuminate the graphics. A one-piece lens is positioned at a distance from the applique with the gage pointer being positioned between the front surface of the applique and the lens. The lens includes a lens body having functional graphics molded therein to compliment the functionality of the gage and adapted to be visible when the lights behind the applique are not on.

In another aspect, the lens body further includes at least one opaque portion to block the view of elements behind the lens, and at least one translucent portion to allow the view of elements behind the lens.

In yet another aspect, the functional graphics comprise a plurality of tick marks for the underlying gage and gage pointer, and the functional graphics comprise a printed film that is injected molded within the lens body.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 4 is a front view of the gage assembly from FIG. 2 shown assembled with lights behind the applique on;

DETAILED DESCRIPTION OF THE PREFERRED EMBODIMENTS

Figure 1:
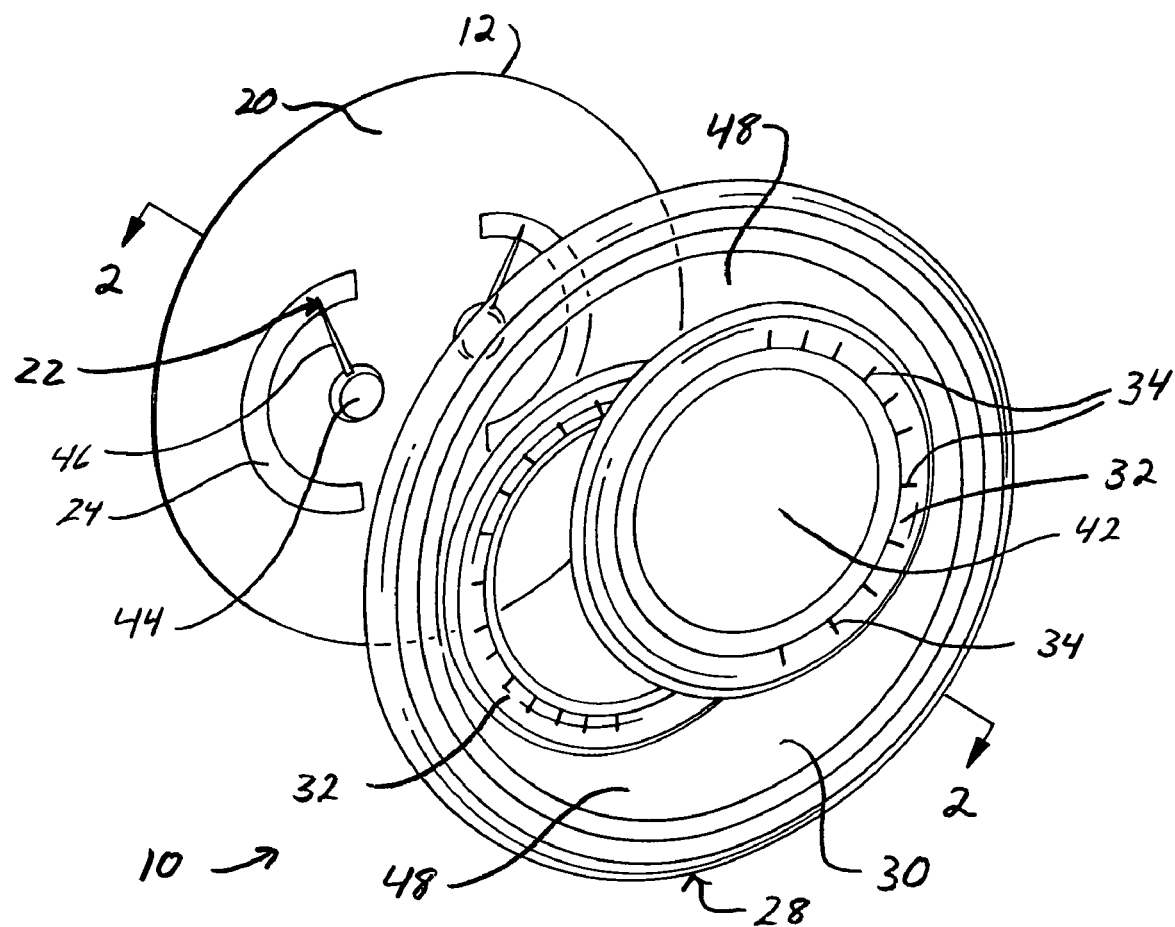
FIG. 1 is a perspective view of a one-piece lens of the present invention shown spaced from an applique.
Figure 2:
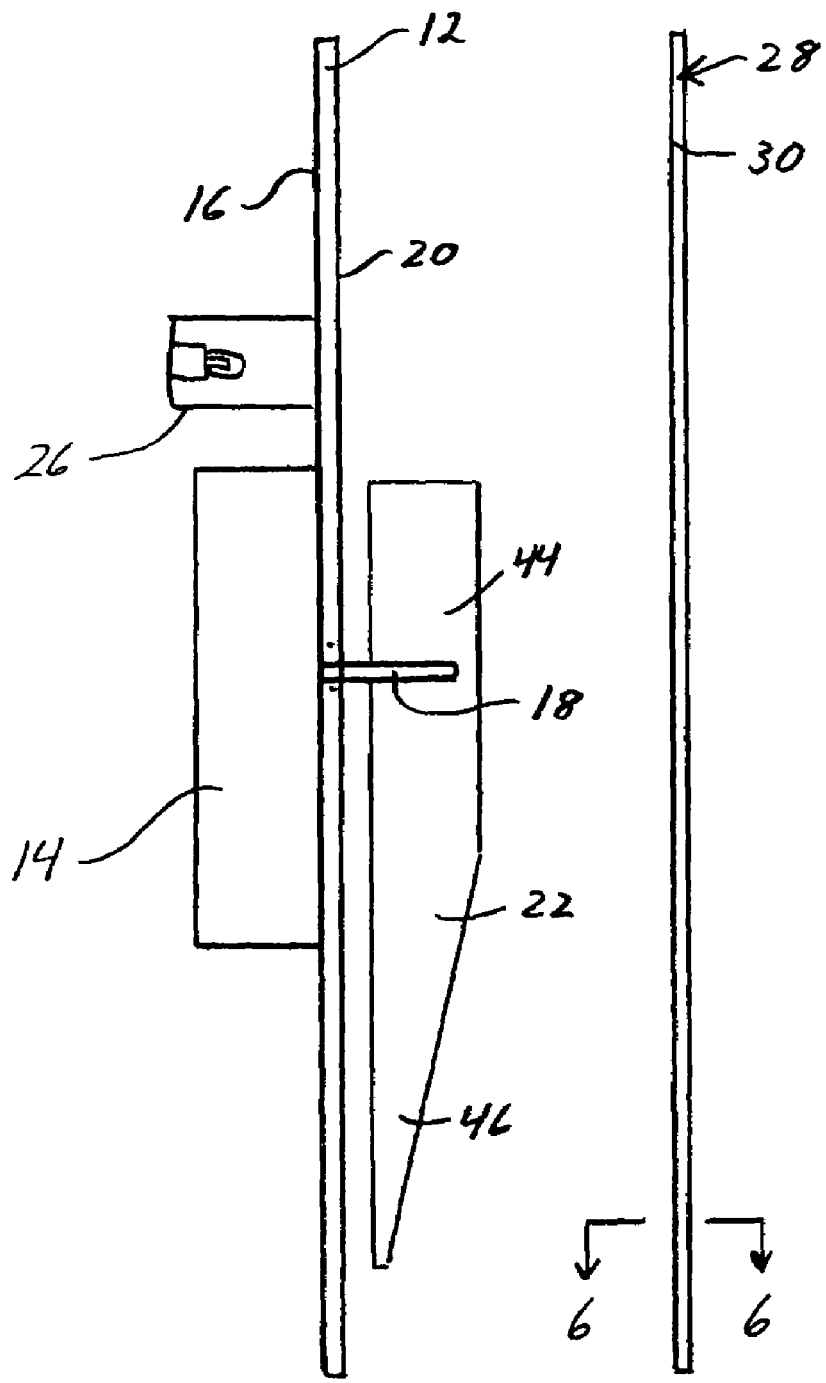
FIG. 2 is a side view of the one-piece lens and applique from FIG. 1.

Referring to FIGS. 1 and 2, a gage assembly having a one-piece lens according to the present invention is shown generally at 10. The gage assembly 10 includes an applique 12 that defines the background for the gage. At least one gage mechanism 14 is mounted to a rear surface 16 of the applique 12. The gage assembly 10 shown in FIG. 1 includes two gages. Each of the gage mechanisms 14 include a pointer shaft 18 that extends through the applique 12 and projects outward from a front surface 20 of the applique 12. A gage pointer 22 is mounted onto each pointer shaft 18 adjacent the front surface 20 of the applique 12. The front surface 20 of the applique 12 includes graphics 24 printed thereon. The graphics 24 can be tick marks, numbers, or other graphics suitable for the purpose of the particular gage.

A plurality of lights 26 are mounted behind the applique 12. When the lights 26 are on, the graphics 24 printed on the applique 12 are visible. When the lights 26 are off, the smoked color of the applique 12 makes the graphics 24 almost invisible. A one-piece lens 28 is positioned at a distance from the applique 12 with the gage pointer 22 being positioned between the front surface 20 of the applique 12 and the lens 28. The lens 28 includes a lens body 30 having functional graphics 32 molded therein. The functional graphics 32 compliment the functionality of the gage and are adapted to be visible when the lights 26 behind the applique 12 are not on.

The functional graphics 32 that are formed within the lens body 30 are designed to compliment the gage behind the lens 28. For example, as shown in FIG. 1, the lens body 30 includes tick marks 34 molded therein. The tick marks 34 correspond to the graphics (numeric indications) 24 that are printed on the face of the applique 12.

Figure 6:
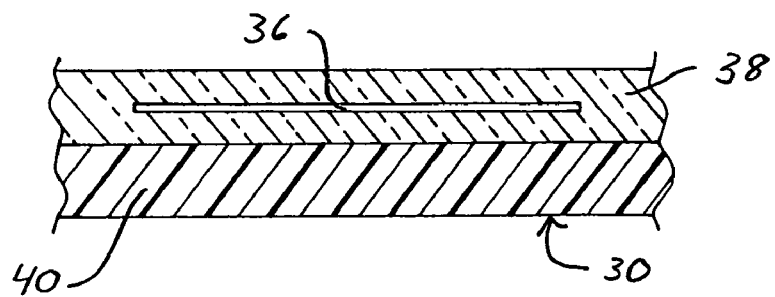
FIG. 6 is a side sectional view of a portion of the one-piece lens wherein the lens includes a tinted layer, a substantially clear layer, and a graphic film injection molded within the substantially clear layer.

The lens 28 is preferably formed by a two-shot plastic injection molding process. The functional graphics 32 are on a printed film 36 that is molded within the lens body 30 during the injection molding process. The film 36 can be translucent, opaque, transparent, or color tinted to control the light and visibility of the graphics display. Referring to FIG. 6, a cross section of a lens body 30 is shown wherein the lens body 30 includes a first layer 38 of tinted material and a second layer 40 that is substantially clear. A graphic film 36 is molded within the substantially clear layer 40.

The functional graphics 32 are molded within the lens body 30, which is positioned at a distance from the applique 12. Therefore, ambient light can get behind the functional graphics 32 formed within the lens body 30 such that the functional graphics 32 are visible even when the lighting 26 behind the applique 12 is not on.

The lens body 30 further includes at least one opaque portion 42 formed therein. The opaque portion 42 will provide an area that will block the view of any components or elements behind that portion of the lens body 30. For example, the opaque portion 42 of the lens body 30 shown in FIG. 1 is immediately in front of the hub portion 44 of the gage pointer 22. This way, only the needle portion 46 of the gage pointer 22 is visible, thereby making the gage more ascetically pleasing.

The lens body 30 also includes at least one translucent portion 48 formed therein. The translucent portion 48 provides an area that will allow the operator of the vehicle to see through the lens 28 to see the components or element of the gage behind the translucent portion 48. For example, the translucent portion 48 of the lens body 30 shown in FIG. 1 is immediately in front of the graphics 24 that are printed on the applique 12, such that when the lights 26 behind the applique 12 are on, the graphics 24 will be visible through the translucent portion 48 of the lens 28.

The lens 28 can be substantially flat, or alternatively, the lens can have a contoured face. A contoured face will provide additional visual depth, further enhancing the appearance of the gage assembly. Additionally, since the one-piece lens 28 is a single component, a single piece replaces several pieces to simplify the manufacturing and assembly process.

Figure 3:
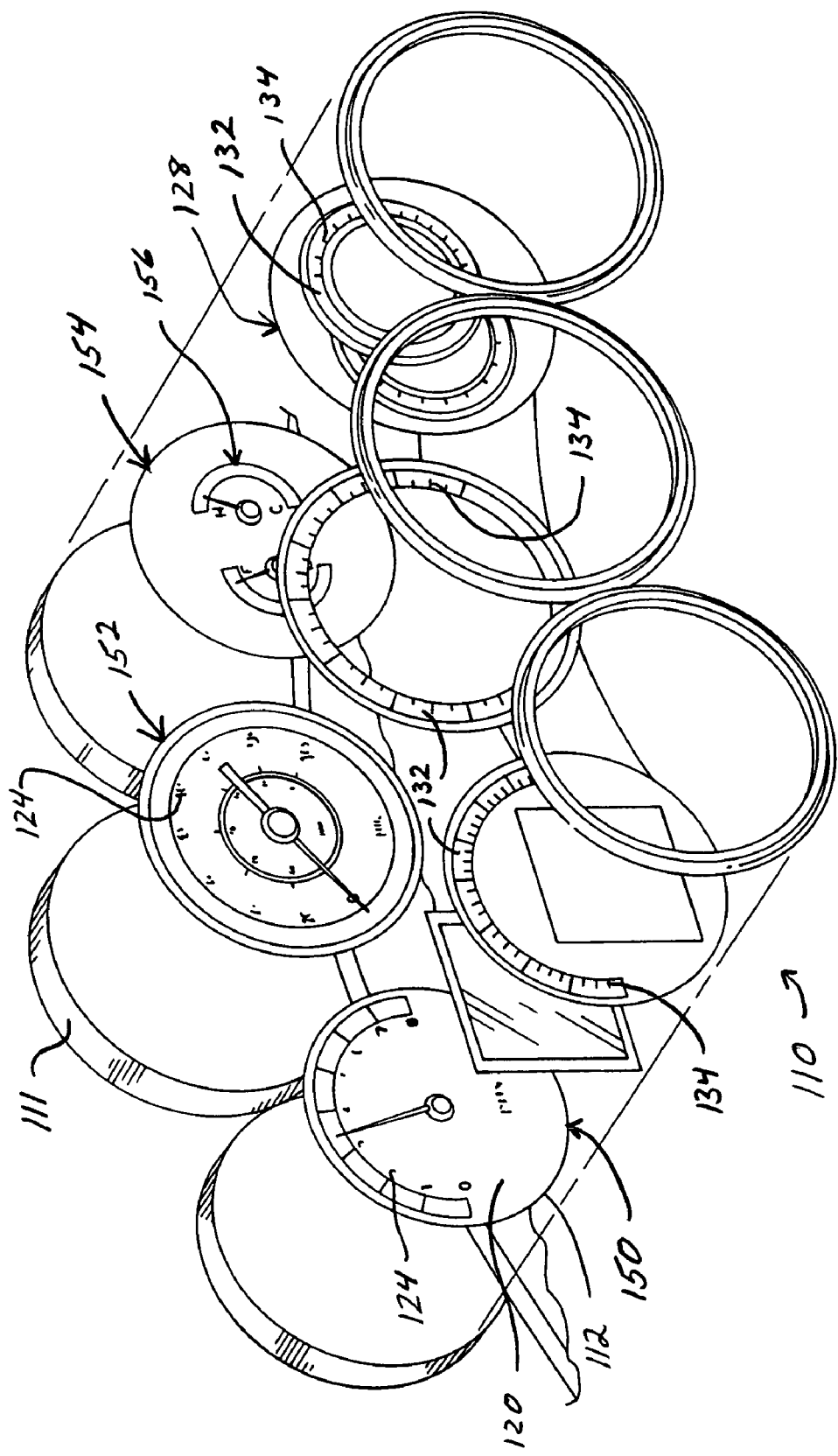
FIG. 3 is an exploded view of a gage assembly of the present invention having four gages and three one-piece lenses according to the teachings of the present invention.
Figure 4:
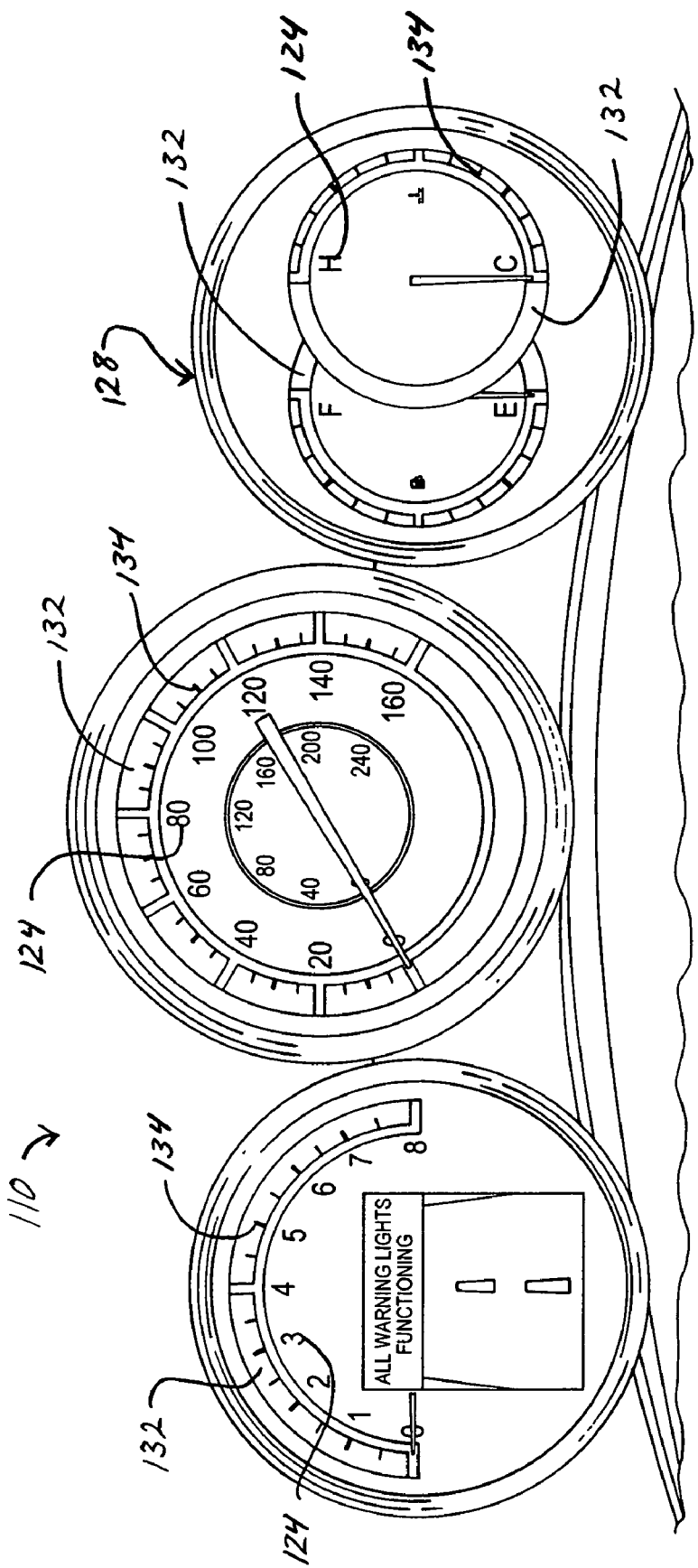
Figure 5:
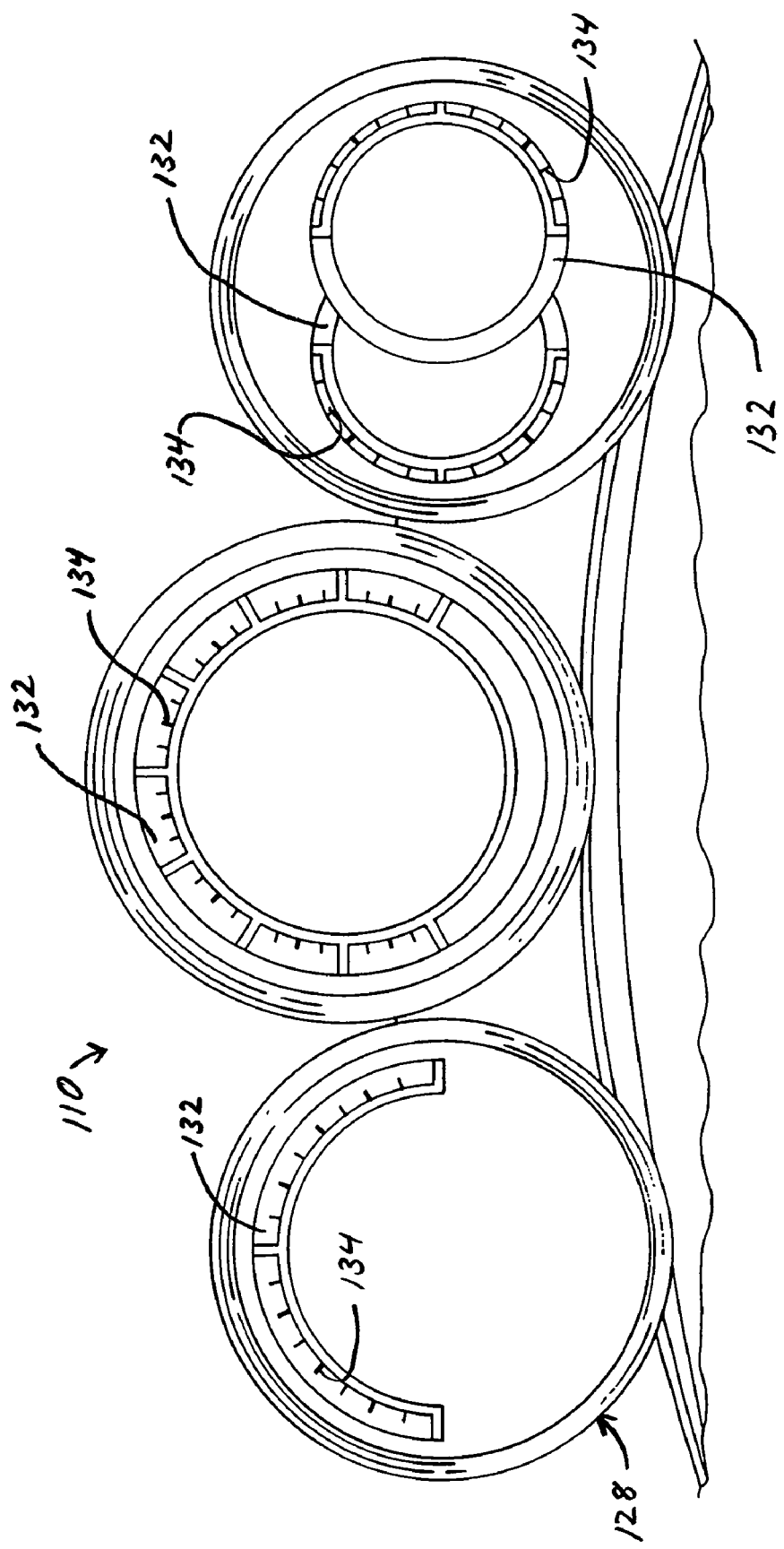
FIG. 5 is a front view similar to FIG. 3 with the lights behind the applique off.

Referring to FIG. 3, a gage assembly having a plurality of gages is shown generally at 110. The gage assembly 110 includes a rear housing 111, an applique 112 having printed graphics 124 on a front face 120, and a one-piece lens 128 that provides coverage for all the gages of the gage assembly 110. The gage assembly 110 includes four gages: a first gage 150 to indicate the RPM's of the engine of the vehicle, a second gage 152 to indicate the speed of the vehicle, a third gage 154 to indicate the fuel level of the vehicle, and a fourth gage 156 to indicate the temperature of the engine coolant. The applique 112 includes the numeric graphics and lettering 124 for the gages. These graphics 124 will only be visible when the lights (not shown) behind the applique 112 are on, as shown in FIG. 4. The one piece lens 128 includes tick marks 134 to further indicate the gage levels. The graphics 132 that are molded into the one-piece lens 128 are visible when the lights (not shown) are on, just as the graphics 124 printed on the applique 112, as shown in FIG. 3. However, the graphics 132 that are molded into the one-piece lens 128 are also visible when the lights behind the applique 112 are off, as shown in FIG. 5.

The foregoing discussion discloses and describes the preferred embodiment, and variations thereof, of the present invention. One skilled in the art will readily recognize from such discussion, and from the accompanying drawings and claims, that changes and modifications can be made to the invention without departing from the true spirit and fair scope of the invention as defined in the following claims.

The invention has been described in an illustrative manner, and it is to be understood that the terminology which has been used is intended to be in the nature of words of description rather than of limitation.

What is claimed is:

1. An instrument gage assembly comprising:
   an applique;
   at least one gage mechanism mounted to a rear surface of the applique, each gage mechanism including a pointer shaft extending through the applique and projecting outward from a front surface of the applique;
   a gage pointer mounted onto each pointer shaft adjacent the front surface of the applique, the front surface of the applique including graphics printed thereon;
   a plurality of lights mounted behind the applique to illuminate the graphics printed on the applique; and
   a one-piece lens positioned at a distance from the applique with the gage pointer being positioned between the front surface of the applique and the lens, the lens including a lens body having functional graphics molded therein to compliment the functionality of the gage pointer and being visible when the lights behind the applique are either on or not on.

2. The instrument gage assembly of claim 1 wherein the lens body further includes at least one opaque portion to block the view, of elements behind the lens.

3. The instrument gage assembly of claim 2 wherein the opaque area is positioned over a hub portion of the gage pointer.

4. The instrument gage assembly of claim 1 wherein the lens body further includes at least one translucent portion to allow the view of elements behind the lens.

5. The instrument gage assembly of claim 4 wherein the translucent area is positioned over the printed portions of the applique.

6. The instrument gage assembly of claim 1 wherein the functional graphics comprise a plurality of tick marks for the underlying gage and gage pointer.

7. The instrument gage assembly of claim 1 wherein the functional graphics comprise a printed film that is injected molded within the lens body.

8. The instrument gage assembly of claim 1 wherein the lens body comprises a substantially clear layer formed on top of a tinted layer, the printed film being injected molded within the substantially clear layer.

9. The instrument gage assembly of claim 1 wherein the. lens is substantially flat.

10. The instrument gage assembly of claim 1 wherein the lens is contoured.

* * * * *